(12) United States Patent
Louie et al.

(10) Patent No.: US 11,980,318 B2
(45) Date of Patent: May 14, 2024

(54) MOCHA POT COMBINED DEVICE AND METHOD FOR USING THE SAME

(71) Applicant: SANDORA HOUSEHOLD ELECTRIC APPLIANCES (SHENZHEN) LTD., Shenzhen (CN)

(72) Inventors: Waihang Louie, Shenzhen (CN); Changhai Yu, Shenzhen (CN); Zhigang Zhu, Shenzhen (CN); Marko Unger, Shenzhen (CN); Kwokwai Wong, Shenzhen (CN)

(73) Assignee: SANDORA HOUSEHOLD ELECTRIC APPLIANCES (SHENZHEN) LTD., Shenzhen (CN)

( * ) Notice: Subject to any disclaimer, the term of this patent is extended or adjusted under 35 U.S.C. 154(b) by 707 days.

(21) Appl. No.: 17/267,422

(22) PCT Filed: Dec. 18, 2020

(86) PCT No.: PCT/CN2020/137762
§ 371 (c)(1),
(2) Date: Feb. 9, 2021

(87) PCT Pub. No.: WO2022/032955
PCT Pub. Date: Feb. 17, 2022

(65) Prior Publication Data
US 2022/0296034 A1  Sep. 22, 2022

(30) Foreign Application Priority Data
Aug. 14, 2020 (CN) .......................... 202010835693.1

(51) Int. Cl.
*A47J 31/56* (2006.01)
*A23F 5/26* (2006.01)
(Continued)

(52) U.S. Cl.
CPC ................. *A47J 31/56* (2013.01); *A23F 5/26* (2013.01); *A47J 31/06* (2013.01); *A47J 31/16* (2013.01)

(58) Field of Classification Search
CPC .. A47J 31/56; A47J 31/06; A47J 31/16; A23F 5/26
See application file for complete search history.

(56) References Cited

U.S. PATENT DOCUMENTS 3,052,791 A * 9/1962 Jacobs ..................... H05B 3/68
219/448.11
2006/0249035 A1  11/2006 Lin

FOREIGN PATENT DOCUMENTS

CN         206700020 U     12/2017
CN         109965700 A      7/2019
(Continued)

OTHER PUBLICATIONS

Machine translation of CN109965700, publication Jul. 5, 2019, pp. 1-6. (Year: 2019).*

(Continued)

*Primary Examiner* — Jenna A Watts
(74) *Attorney, Agent, or Firm* — ANOVA LAW GROUP, PLLC

(57) ABSTRACT

The present disclosure discloses a mocha pot combined device and method for using the same. By combining the pot body with the base, setting a temperature control device and a stirring device in the base, setting a detachable upper pot and lower pot in the pot body, and setting a filter between the upper pot and lower pot, water is stored in the lower pot and heated and then flows into the filter to mix with coffee powder, and it is then extracted to form coffee and flows into the upper pot for storage. The stirring device ensures that the water in the lower pot is evenly heated and reaches the required temperature quickly, and the temperature control (Continued)

device ensures precise control of the water temperature and heating time, thereby realizing automatic control of the coffee-making process, guaranteeing the taste of the coffee, and shortening the coffee brewing time.

8 Claims, 9 Drawing Sheets

(51) Int. Cl.
*A47J 31/06* (2006.01)
*A47J 31/16* (2006.01)

(56) References Cited

FOREIGN PATENT DOCUMENTS

| | | |
|---|---|---|
| CN | 210130713 U | 3/2020 |
| CN | 111990886 A | 11/2020 |
| KR | 20120028775 A | 3/2012 |

OTHER PUBLICATIONS

The World Intellectual Property Organization (WIPO) International Search Report for PCT/CN2020/137762 Apr. 28, 2021 8 pages (translation included).

\* cited by examiner

MOCHA POT COMBINED DEVICE AND METHOD FOR USING THE SAME

CROSS-REFERENCES TO RELATED APPLICATIONS

This application is a national stage application of PCT Patent Application No. PCT/CN2020/137762, filed on Dec. 18, 2020, which claims priority to Chinese Patent Application No. 202010835693.1, filed on Aug. 14, 2020, the content of all of which is incorporated herein by reference.

FIELD OF THE APPLICATION

The present disclosure relates to the field of household appliances for brewing coffee, in particular to a mocha pot combined device and method for using the same.

BACKGROUND

Home-made mocha coffee generally uses a mocha pot for the extraction of espresso. Water in the lower part is boiled by heating the mocha pot, and sprayed into the upper part of the mocha pot through a mesh filter containing coffee powder. As it is difficult to control the temperature by heating with an open flame and it is dangerous to the user, the existing mocha pot is generally heated with an induction stove. However, the operating time cannot be automatically controlled, and the temperature of the coffee still cannot be controlled with the use of an induction stove. In order to prevent coffee from being burned due to a rapid increase in temperature, the existing mocha pot has a long brewing time and users need to be present to watch over it during the coffee-making process, which is a waste of time and energy.

Therefore, there is room for the improvement and development of the prior art.

BRIEF SUMMARY OF THE DISCLOSURE

In view of the above-mentioned shortcomings of the prior art, the objective of the present disclosure is to provide a mocha pot combined device and its method of use, so as to resolve the problem of the inability of the mocha pot of the prior art to automatically control working time, which results in the coffee temperature being uncontrollable and the brewing time being too long.

The technical solution of the present disclosure is as follows:

A mocha pot combined device, which comprises:

a base, an upper part of the base is open to form a holding cavity, the base is provided with a stirring device under the holding cavity, and a temperature control device encircles the holding cavity;

a pot body, the pot body comprises a lower pot placed in the holding cavity, an upper pot detachably connected to the lower pot, and a filter set in the lower pot and connected to the upper pot. Water is stored in the lower pot, heated and flows into the filter to mix with coffee powder, and then extracted to form coffee that flows into the upper pot for storage.

In the mocha pot combined device, the lower pot has a stirring head which corresponds to the stirring device; and the stirring device comprises:

a magnetic component that corresponds to the stirring head, and magnetic blocks that are correspondingly set in the magnetic component and the stirring head;

a motor that drives a rotation of the magnetic component through a rotating shaft, and drives a rotation of the stirring head through a magnetic force between the magnetic component and the stirring head.

In the mocha pot combined device, the temperature control device comprises:

a heater that encircles the holding cavity;

a temperature sensor that is set at a bottom of the holding cavity, with one end of the temperature sensor in contact with a bottom surface of the lower pot, and another end connected to the heater.

In the mocha pot combined device, the filter is formed by sequentially connecting a first end, a connecting portion and a second end, which are all cylindrical. A diameter of the first end matches a dimension of a top opening of the lower pot and a diameter of the second end matches a dimension of the stirring head. After the filter and the lower pot are assembled, a top of the first end is flush with the top opening of the lower pot, and the second end encircles and envelops the stirring head.

In the mocha pot combined device, the first end is provided with a first end partition with filter holes, and the first end partition is used for placing coffee powder. Water enters the first end through the filter holes to mix with the coffee powder.

In the mocha pot combined device, the pot body has a filter screen that is located between the filter and the upper pot. After water mixes with coffee powder, a coffee mixture is filtered through the filter screen to form coffee that enters the upper pot.

In the mocha pot combined device, a center of a bottom of the upper pot has a through hole, and a hollow duct in the upper pot is perpendicular to the through hole. Coffee flows into the upper pot for storage through the duct via the through hole.

In the mocha pot combined device, a top of the duct is detachably provided with a cap, and the cap guides coffee into the upper pot.

In the mocha pot combined device, the base further comprises a control device and a control circuit board. The control device is electrically connected to the control circuit board, and the control circuit board is separately electrically connected to the temperature control device and the stirring device.

A method for using the mocha pot combined device, comprises steps of:

S100: sleeving the stirring head on the lower pot protrusion, filling the lower pot with water, and placing coffee powder at the first end of the filter;

S200: assembling the pot body into a whole, and placing the pot body on the base;

S300: turning on the temperature control device and the stirring device via the control device, and heating and stirring the water in the lower pot;

S400: the water in the lower pot is pressurized by steam and enters the filter to mix with coffee powder, and the coffee mixture is fully extracted and filtered to form coffee and is stored in the upper pot.

Compared with the prior art, the present disclosure provides a mocha pot combined device and method for using the same. By combining the pot body with the base, setting a temperature control device and a stirring device in the base, setting a detachable upper pot and lower pot in the pot body, and setting a filter between the upper pot and lower pot, water is stored in the lower pot and heated and then flows into the filter to mix with coffee powder, and it is then extracted to form coffee that flows into the upper pot for storage. The stirring device ensures that the water in the lower pot is evenly heated and reaches the required temperature quickly, and the temperature control device ensures precise control of the water temperature and heating time, thereby realizing automatic control of the coffee-making process, guaranteeing the taste of the coffee, and preventing the coffee quality from being affected due to improper operation by the user. There is no need for users to be present for monitoring during the production process, which saves waiting time.

DETAILED DESCRIPTION

The present disclosure provides a mocha pot combined device and its method of use. In order to make the objectives, technical solutions and effects of the present disclosure clearer and more specific, the present disclosure will be described in further detail below. It should be understood that the specific embodiments described here are only used to explain the present disclosure, and are not used to limit the present disclosure.

It should be noted that the orientational and positional relationships indicated by the terms "center", "upper/above", "lower/below", "left", "right", "inner/inside", "outer/outside", "vertical/perpendicular", "horizontal/level", "flush", etc. are based on the orientational and positional relationships indicated by the drawings. They are only for the convenience of describing the present disclosure and simplifying the description, and are not for indicating or implying that the structure referred to must have a specific orientation or must be constructed in a specific orientation, nor shall they be understood as limitations of the present disclosure.

In addition, unless the article is specifically defined by the context, "a" and "the" can generally refer to a single item or a plurality of items. If there are descriptions of "first", "second" and the like in the embodiments of the present disclosure, the descriptions of "first", "second" and the like are only for the purpose of description, and shall not be understood as indicating or implying their relative importance or implicitly indicating the number of technical features referred to. Thus, features defined as "first" and "second" may explicitly or implicitly include at least one of such features. In addition, the technical solutions between the various embodiments can be combined with each other, but they must be based on what can be achieved by those of ordinary skill in the art. Where the combination of technical solutions is contradictory or cannot be realized, it should be considered that such a combination of technical solutions does not exist and is not within the claimed scope of protection of the present disclosure.

Figure 1:
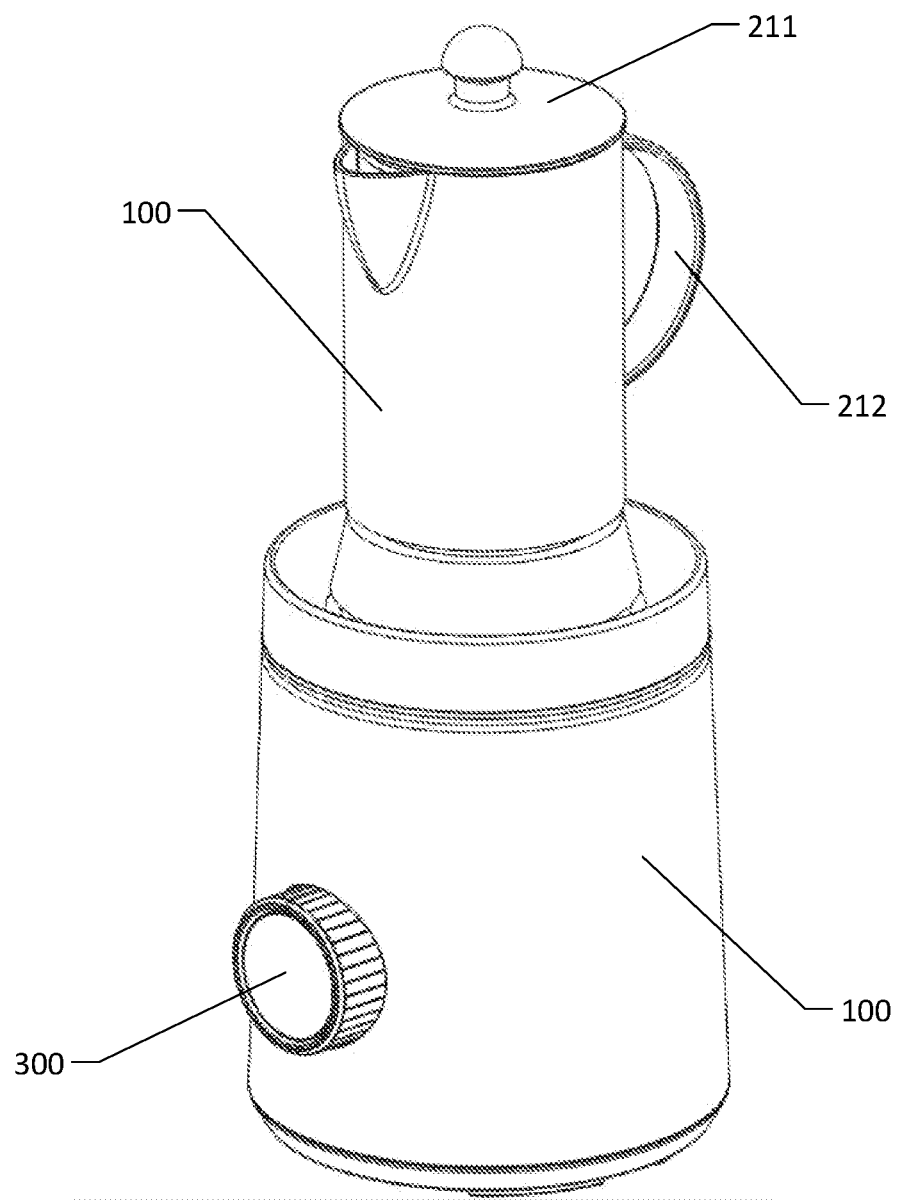
FIG. 1 is the three-dimensional diagram of the mocha pot combined device of the present disclosure.
Figure 3:
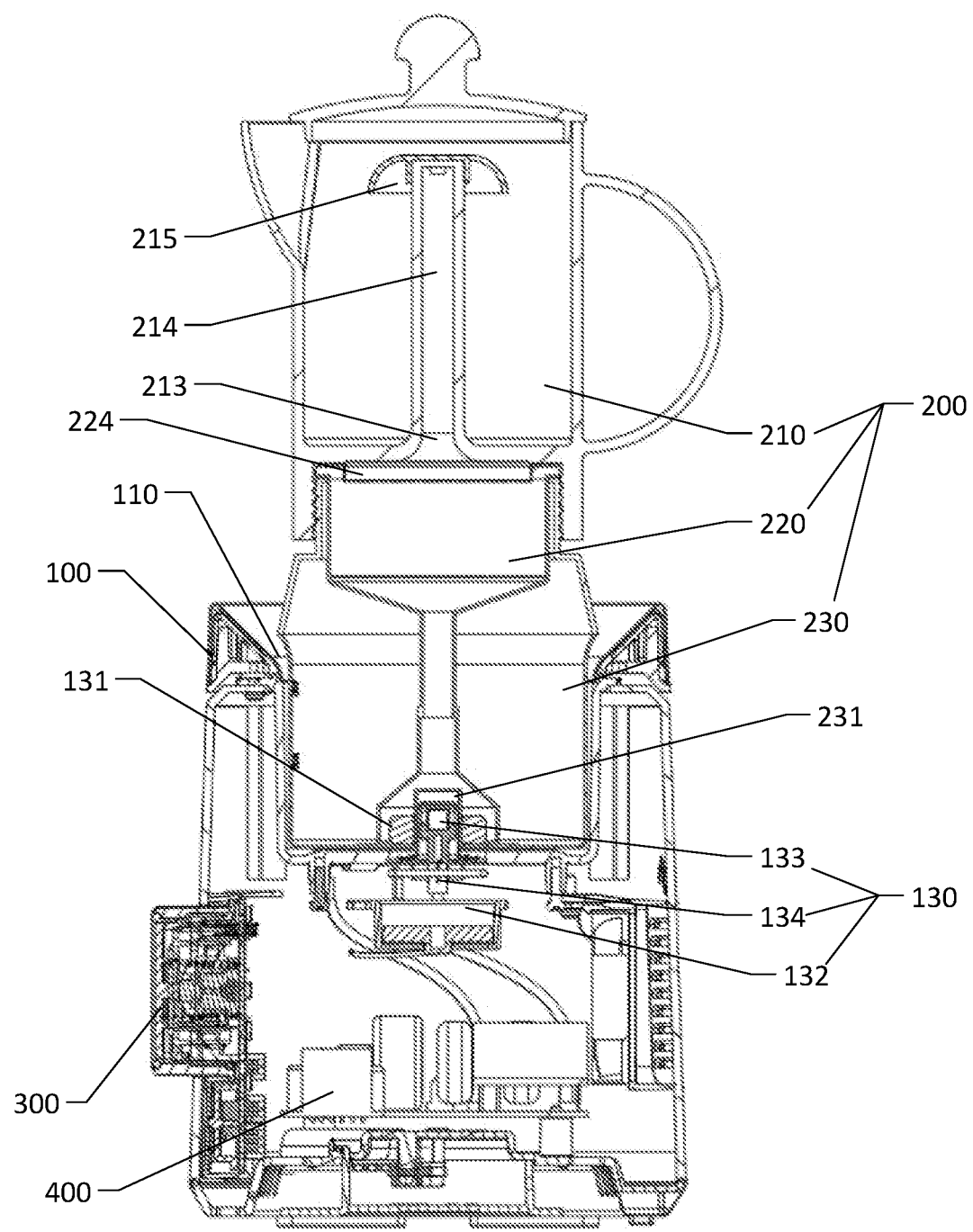
FIG. 3 is the cutaway diagram of the mocha pot combined device of the present disclosure.

The present disclosure provides a mocha pot combined device. As shown in FIG. 1, the mocha pot combined device comprises a base 100 and pot body 200, and the pot body 200 is placed on the base 100. As shown in FIG. 3, the upper part of the base 100 is open to form a holding cavity 110, which has a stirring device 130 under it, and a temperature control device 120 encircles the holding cavity 110. The pot body 200 comprises an upper pot 210 and a lower pot 230 that are detachably connected, and a filter 220 set in the lower pot 230 and connected to the upper pot 210. The pot body 200 is placed in the holding cavity 110 of the base 100 through the lower pot 230. When coffee, especially mocha coffee, needs to be made, water is added to the lower pot 230 and coffee powder is added to the filter, and the heating temperature and heating time of the pot body 200 are automatically controlled via the temperature control device 120 and the stirring device 130. Delicious coffee can be made without requiring users to be present for monitoring, and this saves time and reduces the difficulty of use.

Figure 4:
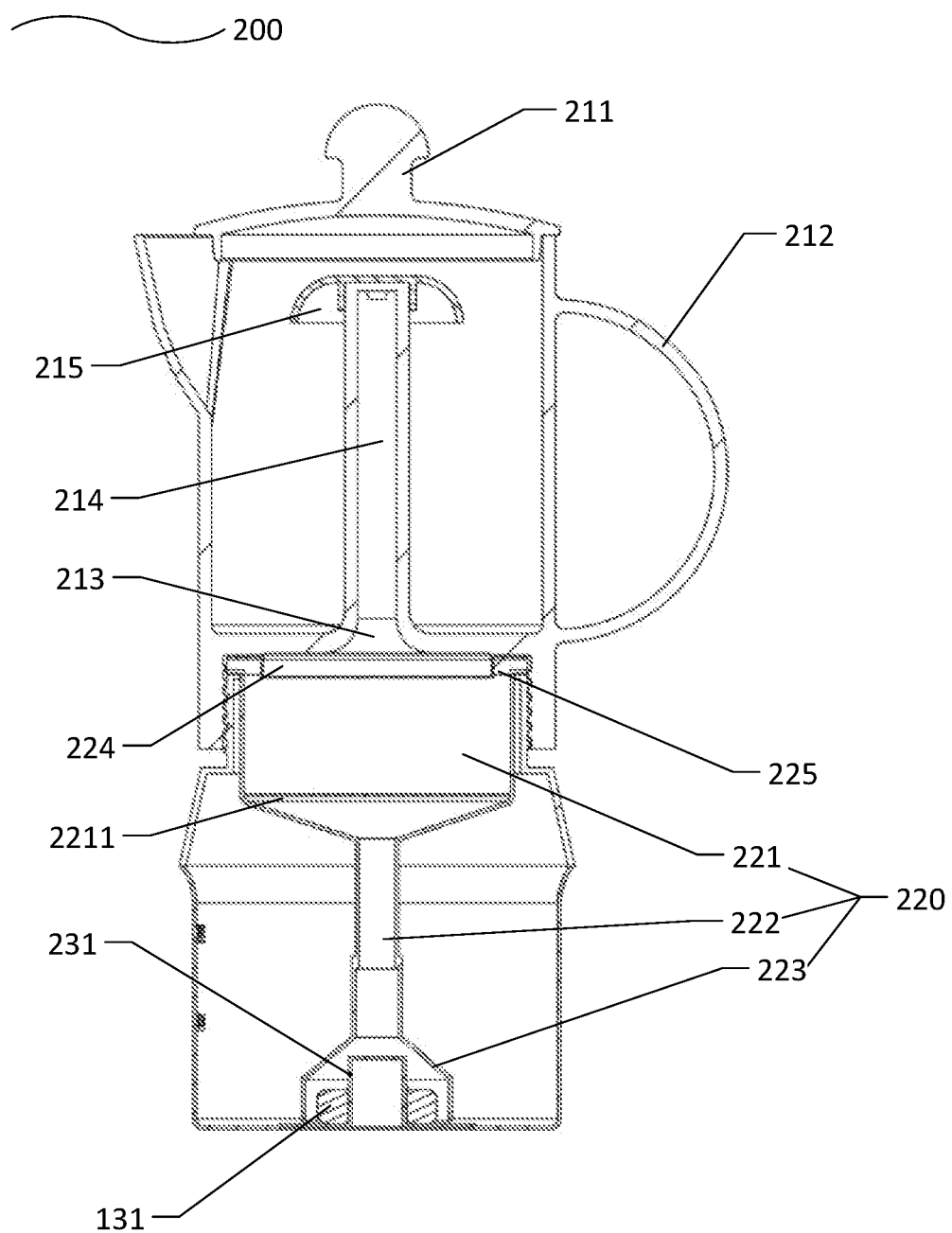
FIG. 4 is the cutaway diagram of the pot body of the mocha pot combined device of the present disclosure.

The upper pot 210 of the pot body 200 is used to store the prepared coffee. As shown in FIG. 4, the bottom of the upper pot 210 has a through hole 213, and there is a hollow duct 214 in the upper pot 210 that is perpendicular to the through hole 213. Further, the duct 214 should be a metal duct. Further, the duct 214 should be a siphon. One end of the duct 214 is connected to the through hole 213 in a fixed manner, and the other end of the duct 214 is close to the top of the upper pot 210. During use, the prepared coffee enters the upper pot 210 through the through hole 213 along the duct 214. Further, a cap 215 is fitted at one end of the duct 214 close to the top of the upper pot 210. The cap 215 is curved and is used to guide the prepared coffee that gushes out from the duct 214 such that it drips down and is stored in the upper pot 210, preventing the coffee from spraying upwards. The cap 215 is detachably connected to the duct 214, so as to facilitate cleaning after use.

As shown in FIG. 4, the upper pot 210 also has an upper pot cover 211. During use, the upper pot cover 211 is clamped to the upper pot 210 and seals the prepared coffee in the upper pot 210 to prevent the coffee from splashing out of the pot body 200 and dirtying the surroundings. One side of the upper pot 210 also has an upper pot handle 212. Users can move the upper pot 210 through the upper pot handle 212, and can also move the entire pot body 200 through the upper pot handle 212 after connecting the upper pot 210 and the lower pot 230 together. Optionally, an upper pot edge 216 extends vertically downward from the bottom of the upper pot 210, and the upper pot edge 216 is used to detachably connect to the lower pot 230. For example, an internal thread may be provided on the inner side of the upper pot edge 216 for a threaded connection with the lower pot 230. The upper pot 210 can also be detachably connected to the lower pot 230 by other means, such as by a snap-fit connection or a socket-type connection, and no limitation is made here.

Figure 9:
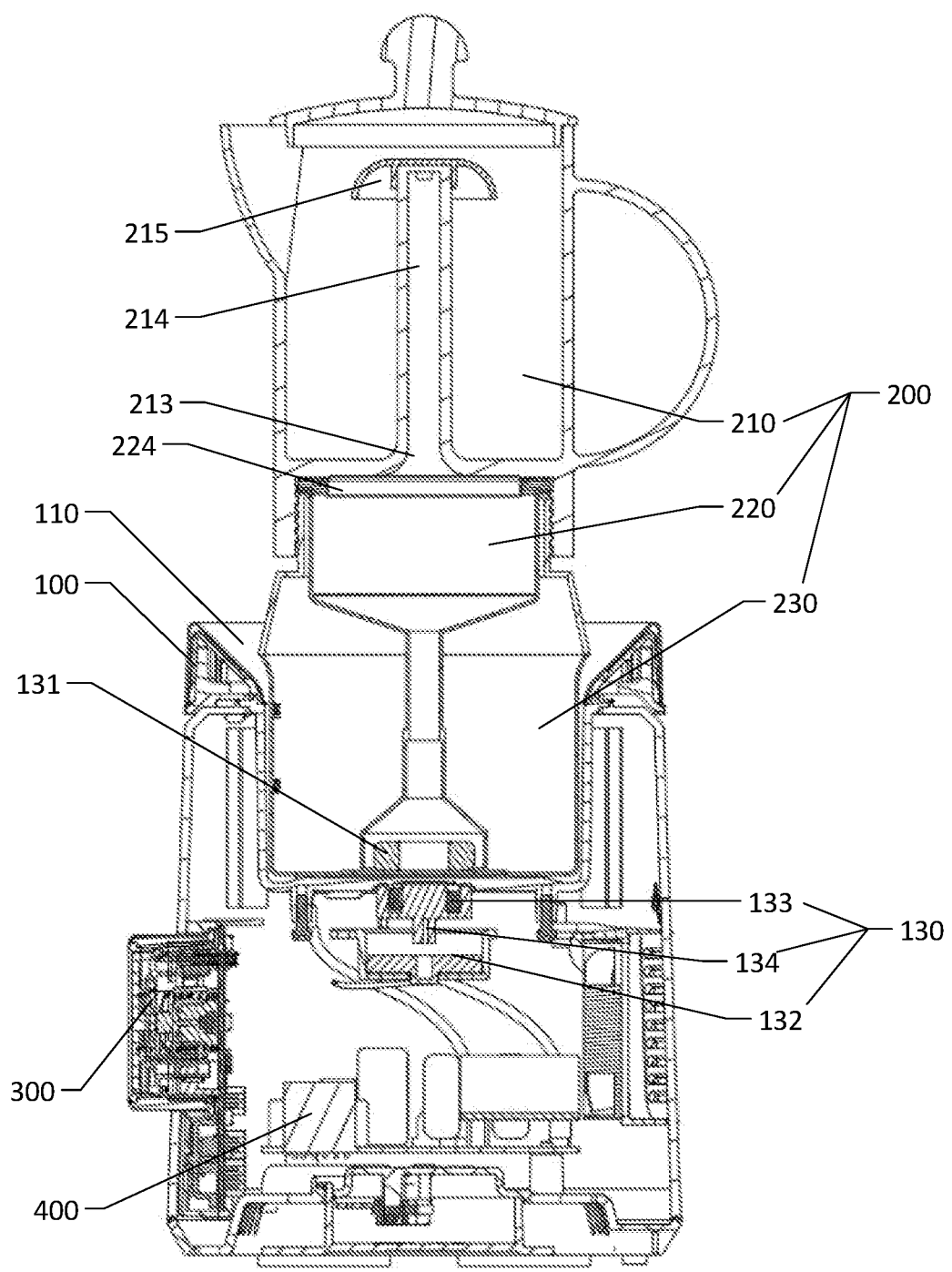
FIG. 9 is the cutaway diagram of another embodiment of the mocha pot combined device of the present disclosure.

The lower pot 230 is used to store pure water, and it provides boiled water during the coffee preparation process. As shown in FIG. 3 and FIG. 9, the inside of the lower pot 230 has a stirring head 131 at the position that corresponds to the stirring device 130. The stirring head 131 is used to stir the liquid in the lower pot 230 so as to ensure that the temperature of the liquid in the lower pot 230 is consistent throughout during the heating process. The stirring head 131 is placed at the bottom of the lower pot 230 and interacts with the stirring device 130 through magnetic force. When making coffee, the stirring head 131 rotates and stirs the liquid in the lower pot 230 under the action of magnetic force. In one embodiment, as shown in FIG. 9, the bottom of the lower pot 230 is flat, and the stirring head 131 is placed at the center of the bottom of the lower pot 230 at the position corresponding to the stirring device 130. In another embodiment, as shown in FIG. 3 and FIG. 4, the center of the bottom of the lower pot 230 extends vertically upward to form the lower pot protrusion 231, which has a height difference with the bottom of the pot body 200, and the stirring head 131 can be detachably sleeved on the lower pot protrusion 231. Further, the lower pot protrusion 231 is a cylindrical protrusion, and when the lower pot protrusion 231 is viewed from above, the cross-section of the lower pot protrusion 231 is circular. Optionally, the outer side of the top of the lower pot 230 has an external thread so as to engage with the internal thread of the upper pot edge 216 to realize the detachable connection of the lower pot 230 and the upper pot 210. The lower pot 230 can also be detachably connected to the upper pot 210 by other means, such as by a snap-fit connection or a socket-type connection, and no limitation is made here.

Further, the stirring head 131 is annular and has a symmetrical structure, wherein the annular inner ring of the stirring head 131 matches the dimensions of the lower pot protrusion 231, the stirring head 131 is sleeved on the lower pot protrusion 231 through the inner ring, and the stirring head 131 can slide up and down freely along the lower pot protrusion 231, such that the stirring head 131 can be easily installed and disassembled. Since the stirring head 131 has a symmetrical structure, when liquid is added to the lower pot 230, the stirring head 131 will not tilt due to one side being too heavy and result in scratching between the stirring head 131 and the lower pot protrusion 231, which would affect the stirring effect. Optionally, the stirring head 131 may be designed with a symmetrical hollow structure to reduce the weight of the stirring head 131, so as to reduce the friction between the stirring head 131 and the lower pot protrusion 231. Since the stirring head 131 can freely slide on the lower pot protrusion 231, the stirring head 131 can be taken out of the lower pot 230 after use, and the lower pot 230 and the stirring head 131 can then be cleaned separately. There are no sanitary blind spots and the difficulty of cleaning is reduced, ensuring the food safety of subsequent coffee production and improving the quality of coffee.

Figure 5:
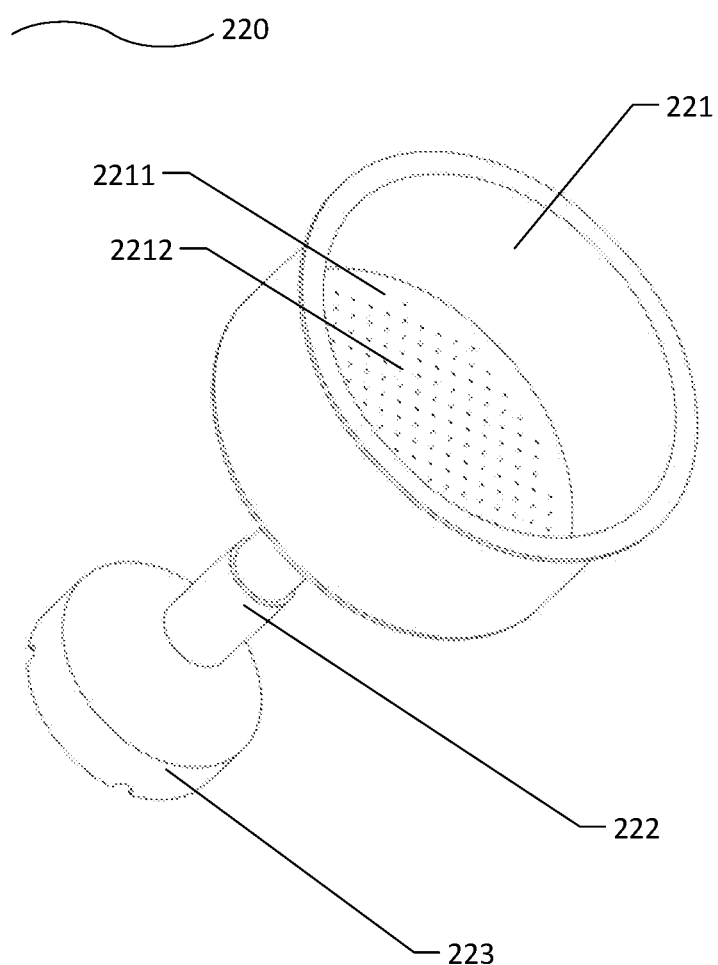
FIG. 5 is the three-dimensional diagram of the filter of the mocha pot combined device of the present disclosure.

A filter 220 is provided between the upper pot 210 and the lower pot 230, and it is used to mix the boiled water provided by the lower pot 230 with coffee powder to make liquid coffee, and transfer the prepared coffee to the upper pot 210 for storage. As shown in FIG. 5, the filter 220 comprises a first end 221, a second end 223 and a connecting portion 222 that connects the first end 221 and the second end 223. The first end 221, the second end 223 and the connecting portion 222 are all cylindrical and have different diameters. As shown in FIG. 4, the first end 221 is connected to the connecting portion 222 to form a funnel shape, and the second end 223 is connected to the connecting portion 222 to form an inverted funnel shape. The boiled water provided by the lower pot 230 passes through the second end 223 and the connecting portion 222 in sequence, and is mixed with coffee powder in the first end 221 to form a coffee mixture, which then passes through the through hole 213 and the duct 214 after being filtered, and enters the upper pot 210 for storage.

As shown in FIG. 4, the diameter of the second end 223 matches the dimensions of the stirring head 131. After the filter 220 and the lower pot 230 are assembled together, the second end 223 encircles and envelops the stirring head 131. Further, the axial length of the second end 223 is greater than the height of the lower pot protrusion 231, so as to ensure that there is a gap between the lower pot protrusion 231 and the filter 220, allowing liquid to flow freely. Further, the edge of the second end 223 is close to the bottom of the lower pot 230, and the edge of the second end 223 is provided with a notch to allow the liquid in the lower pot 230 to flow in or out freely, so as to avoid affecting the stirring effect of the stirring head 131.

As shown in FIG. 4, the diameter of the first end 221 matches the dimensions of the top opening of the lower pot 230. After the filter 220 and the lower pot 230 are assembled together, the top of the first end 221 is flush with the top opening of the lower pot 230. After the upper pot 210 and the lower pot 230 are assembled together, the top of the first end 221 is connected to the bottom of the upper pot 210. Further, the top of the first end 221 extends horizontally outwards to form an annular edge and the first end 221 is clamped at the opening of the lower pot 230 to prevent the filter 220 from dropping. As shown in FIG. 5, the first end 221 is further provided with a first end partition 2211, which is provided with filter holes 2212. Coffee powder is placed on the first end partition 2211. The boiled water provided by the lower pot 230 passes through the second end 223 and the connecting portion 222, and flows into the first end 221 from the filter holes 2212 and mixes with the coffee powder. The coffee mixture is obtained through sufficient extraction, and then passes through the through hole 213 and the duct 214 after being filtered, and enters the upper pot 210 for storage.

Figure 2:
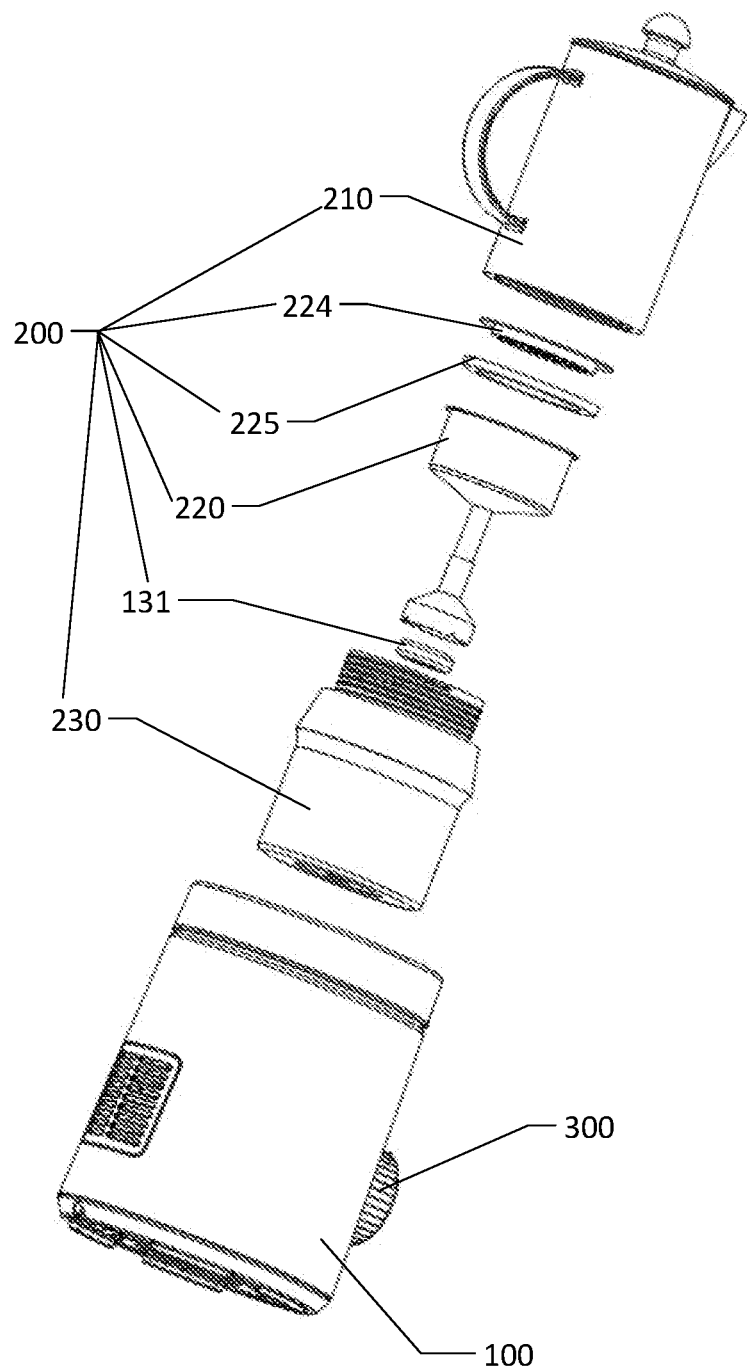
FIG. 2 is the exploded-view diagram of the mocha pot combined device of the present disclosure.

As shown in FIG. 2 and FIG. 4, the pot body 200 is also provided with a filter screen 224. The filter screen 224 is set between the first end 221 of the filter 220 and the upper pot 210, and is used to filter the coffee mixture in the first end 221, so as to ensure that there is no residual solid powder in the coffee liquid stored in the upper pot 210 and ensure a good taste. Further, a washer 225 is also provided between the filter screen 224 and the first end 221. The washer 225 can prevent liquid from leaking out during the coffee-making process, and can also prevent the filter screen 224 from sliding relative to the first end 221 and falling out. Furthermore, an additional washer may be provided between the filter screen 224 and the upper pot 210, so as to ensure the fixation of the filter screen 224 and prevent liquid coffee from leaking out during use.

Figure 6:
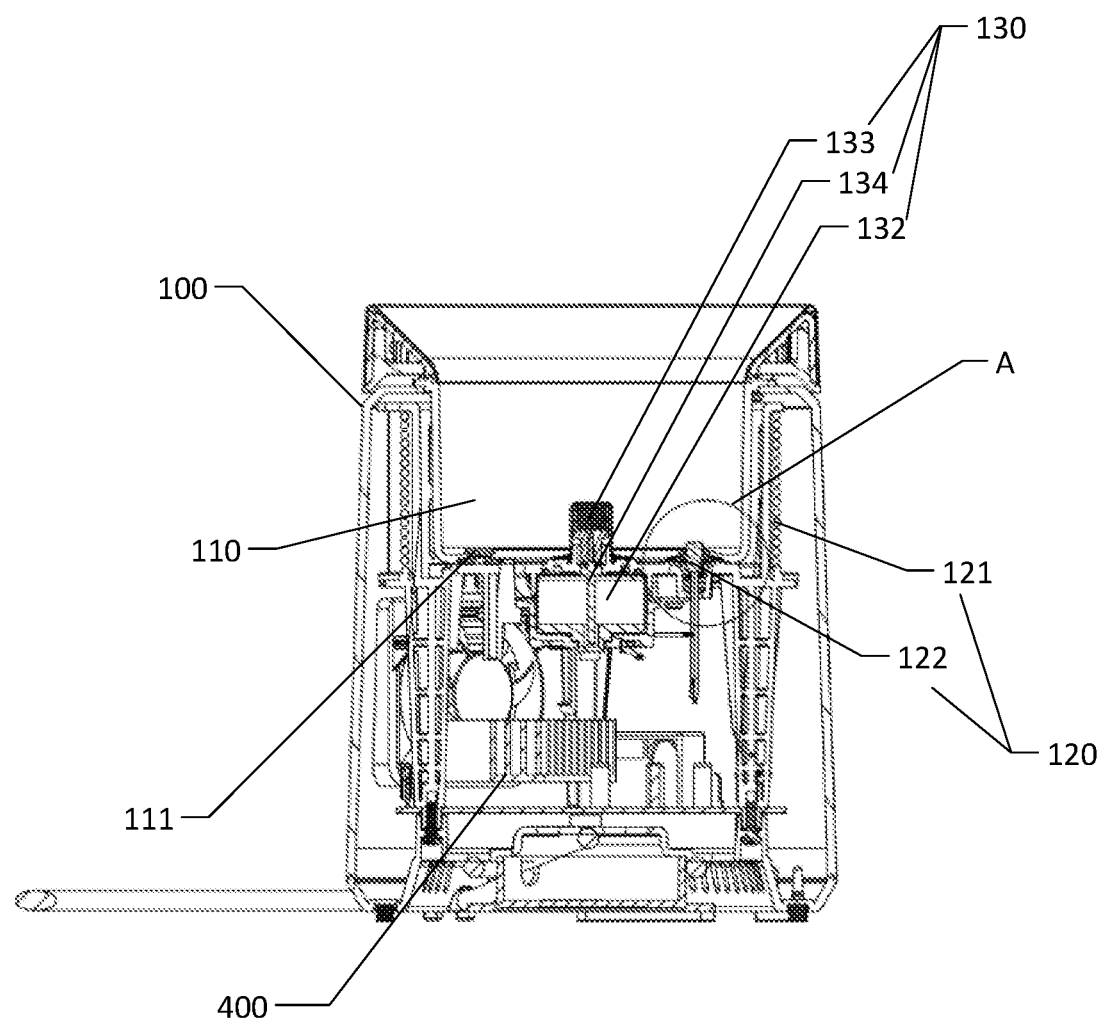
FIG. 6 is the cutaway diagram of the base of the mocha pot combined device of the present disclosure.

As shown in FIG. 6, the temperature control device 120 of the base 100 comprises the heater 121 and temperature sensor 122, and the heater 121 encircles the holding cavity 110. Optionally, the heater 121 is an induction heating coil. Further, the heater 121 is located in the gap between the side wall of the holding cavity 110 and the base 100. The heater 121 relies on a vertical coil to generate electromagnetic induction through the holding cavity 110 and the lower pot 230 of the pot body 200 to heat the lower pot 230. The temperature sensor 122 is set at the bottom of the holding cavity, with one end of the temperature sensor 122 in contact with the bottom surface of the lower pot 230, and with the other end of the temperature sensor 122 passing through the holding cavity 110 and connecting to the heater 121. The temperature sensor 122 controls the heating effect of the heater 121 on the lower pot 230 by detecting the temperature of the water in the lower pot 230, so as to realize precise temperature control. The user does not need to wait and watch over the mocha pot when making coffee, thus saving the user waiting time.

Figure 7:
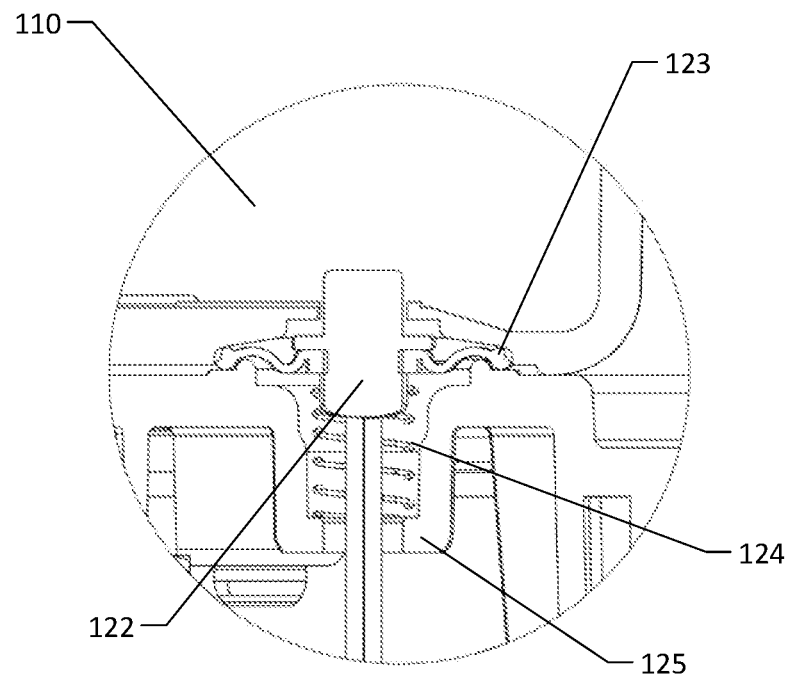
FIG. 7 is the enlarged schematic diagram of part A in FIG. 6.

Further, the temperature control device 120 also comprises a sealing ring 123, as shown in FIG. 7, wherein the sealing ring 123 is located between the temperature sensor 122 and the bottom of the holding cavity 110. The sealing ring 123 adheres closely to the temperature sensor 122, thereby isolating it from liquid. At the same time, the sealing ring 123 fixes the temperature sensor 122, preventing the temperature sensor 122 from tilting and having poor contact with the lower pot 230, which would affect the temperature monitoring.

Further, a sensor-housing cavity 125 is provided under the holding cavity 110 at the position corresponding to the temperature sensor 122, as shown in FIG. 7, wherein the sensor-housing cavity 125 is located directly under the temperature sensor 122 to prevent the temperature sensor 122 from falling off into the base 100. Further, the sensor-housing cavity 125 is also provided with an elastic component 124, with the lower end of the elastic component 124 fixed to the bottom of the sensor-housing cavity 125, and the top of the elastic component 124 connected to the temperature sensor 122. Optionally, the elastic component 124 is a spring. When the pot body 200 is placed, the bottom surface of the lower pot 230 gets in contact with the temperature sensor 122 and exerts a downward pressure on the temperature sensor 122. At this time, the elastic component 124 is compressed and exerts an upward rebound force on the temperature sensor 122, causing the temperature sensor 122 to maintain close contact with the bottom surface of the lower pot 230, and preventing the temperature sensor 122 from sliding away from the bottom surface of the lower pot 230. In addition, since the elastic component 124 exerts an upward rebound force on the temperature sensor 122 after it is compressed, the temperature sensor 122 can remain in contact with the bottom of the lower pot 230, ensuring effective contact between the temperature sensor 122 and the lower pot 230 and ensuring the temperature monitoring of the water in the lower pot 230, thereby realizing precise control of the production process.

In one embodiment of the present disclosure, as shown in FIG. 9, the stirring device 130 in the base 100 is located under the holding cavity 110, and the stirring device 130 comprises the motor 132, the magnetic component 133, and the rotating shaft 134 connecting the motor 132 to the magnetic component 133. After the pot body 200 is placed on the base 100, the magnetic component 133 is located under the lower pot 230 and corresponds to the stirring head 131. Optionally, the magnetic component 133 is provided with a pair of magnetic blocks and there are magnetic blocks symmetrically encapsulated in the stirring head 131, with the magnetic blocks in the magnetic component 133 arranged correspondingly to the magnetic blocks in the stirring head 131. In the static state, under the action of the magnetic force between the magnetic component 133 and the stirring head 131, even if water is added to the lower pot 230, the stirring head 131 will not shift. When entering the stirring state, the motor 132 drives the rotation of the magnetic component 133 through the rotating shaft 134. Under the action of magnetic force, the stirring head 131 starts to rotate and drives the rotation of the water in the lower pot 230, ensuring that the heat in the water is diffused evenly during heating, so as to ensure that the water in the lower pot 230 boils as soon as possible to reach the required state to work.

In another embodiment, as shown in FIG. 3, the motor 132 in the stirring device 130 is located under the holding cavity 110, and the motor 132 extends into the holding cavity 110 through the rotating shaft 134 and connects to the magnetic component 133. The magnetic component 133 is located in the holding cavity 110 under the support of the rotating shaft 134. After the pot body 200 is placed on the base 100, the magnetic component 133 extends into the interior of the lower pot protrusion 231 from below and corresponds to the stirring head 131. Optionally, the magnetic component 133 is provided with a pair of magnetic blocks and there are magnetic blocks symmetrically encapsulated in the stirring head 131, with the magnetic blocks in the magnetic component 133 arranged correspondingly to the magnetic blocks in the stirring head 131. In the static state, under the action of the magnetic force between the magnetic component 133 and the stirring head 131, the stirring head 131 remains relatively fixed to the lower pot protrusion 231, and the stirring head 131 will not fall off from the lower pot protrusion 231 even when water is added. At the same time, under the action of magnetic force, the stirring head 131 is suspended and sleeved on the lower pot protrusion 231 to prevent contact between the stirring head 131 and the bottom of the lower pot 230, so as to reduce friction and facilitate stirring, and also prevent secondary contamination. When entering the stirring state, the motor 132 drives the rotation of the magnetic component 133 through the rotating shaft 134. Under the action of magnetic force, the stirring head 131 starts to rotate while suspended and drive the rotation of the water in the lower pot 230, ensuring that the heat in the water is evenly diffused during heating, so as to ensure that the water in the lower pot 230 boils as soon as possible to reach the required state to work. After the coffee is made, since the stirring head 131 and the stirring device 130 only interact with each other through magnetic force, the stirring head 131 can be easily removed from the lower pot protrusion 231 for cleaning after the pot body 200 is removed from the base 100. This reduces the difficulty of cleaning, ensures the food safety of subsequent coffee production, and improves the quality of coffee.

Figure 8:
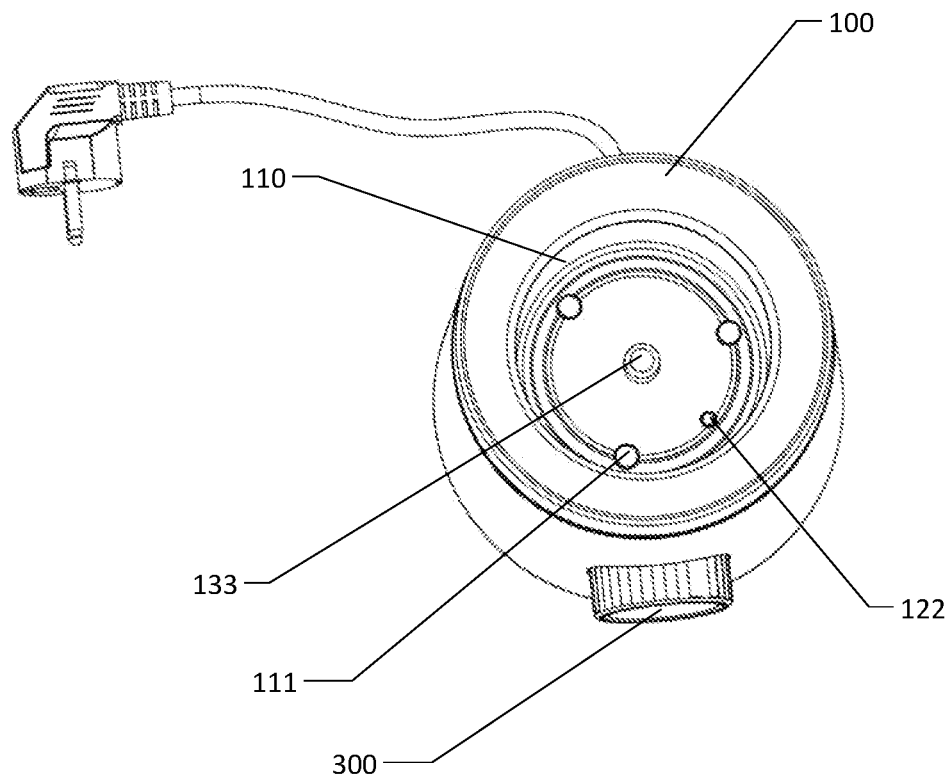
FIG. 8 is the oblique view of the base of the mocha pot combined device of the present disclosure.

The bottom of the holding cavity 110 is also provided with evenly distributed rubber pads 111, as shown in FIG. 8, wherein three rubber pads 111 are distributed in the three equal parts of a circle. When the pot body 200 is placed in the base 100, the bottom surface of the lower pot 230 is placed on the rubber pads 111, and the top surface of the rubber pads 111 are kept in a horizontal plane, so as to ensure that the pot body 200 remains level after placement. When the pot body 200 is placed in the base 100, the lower pot 230 is supported by the rubber pads 111 and is not in direct contact with the side wall of the base 100. This can effectively prevent the pot body 200 from rotating relative to the base 100 during the coffee-making process, and at the same time prevent the pot body 200 from colliding with the base 100 and generating noise, thereby preventing damage from use.

As shown in FIG. 3 and FIG. 9, the base 100 is also provided with a control device 300 and a control circuit board 400. The control device 300 is electrically connected to the control circuit board 400, and the control circuit board 400 is separately electrically connected to the temperature control device 120 and the stirring device 130. Optionally, the control device 300 is a rotary switch.

The following illustrates the method of use of the mocha pot combined device of the present disclosure with examples. First sleeve the stirring head 131 on the lower pot protrusion 231 and add water to the lower pot 230, and then assemble the filter 220 and the lower pot 230, and add coffee powder to the first end 221 of the filter 220 at the same time. After installing the filter screen 224 above the first end 221 of the filter 220, assemble the upper pot 210 and the lower pot 230. After the assembly is completed, place the pot body 200 on the base 100, and control the temperature control device 120 and the stirring device 130 via the control device 300 to get them to start working. The heater 121 then heats the lower pot 230 via the temperature control device 120, and the stirring device 130 drives the rotation of the water in the lower pot 230 by the stirring head 131 to maintain temperature uniformity. After the water in the lower pot 230 is heated, it forms steam that pressurizes the hot water into the filter 220. The hot water enters the first end 221 of the filter 220 and mixes with coffee powder. After sufficient extraction, it is filtered through the filter screen 224, and the prepared coffee enters the upper pot 210 for storage through the through hole 213 and the duct 214. When the coffee is to be drunk, turn off the temperature control device 120 and the stirring device 130, remove the upper pot 210 and pour out the coffee stored in it. It is convenient and fast, and there is no need for the user to stay by the device to monitor the heating process, which saves time and conserves energy.

Figure 10:
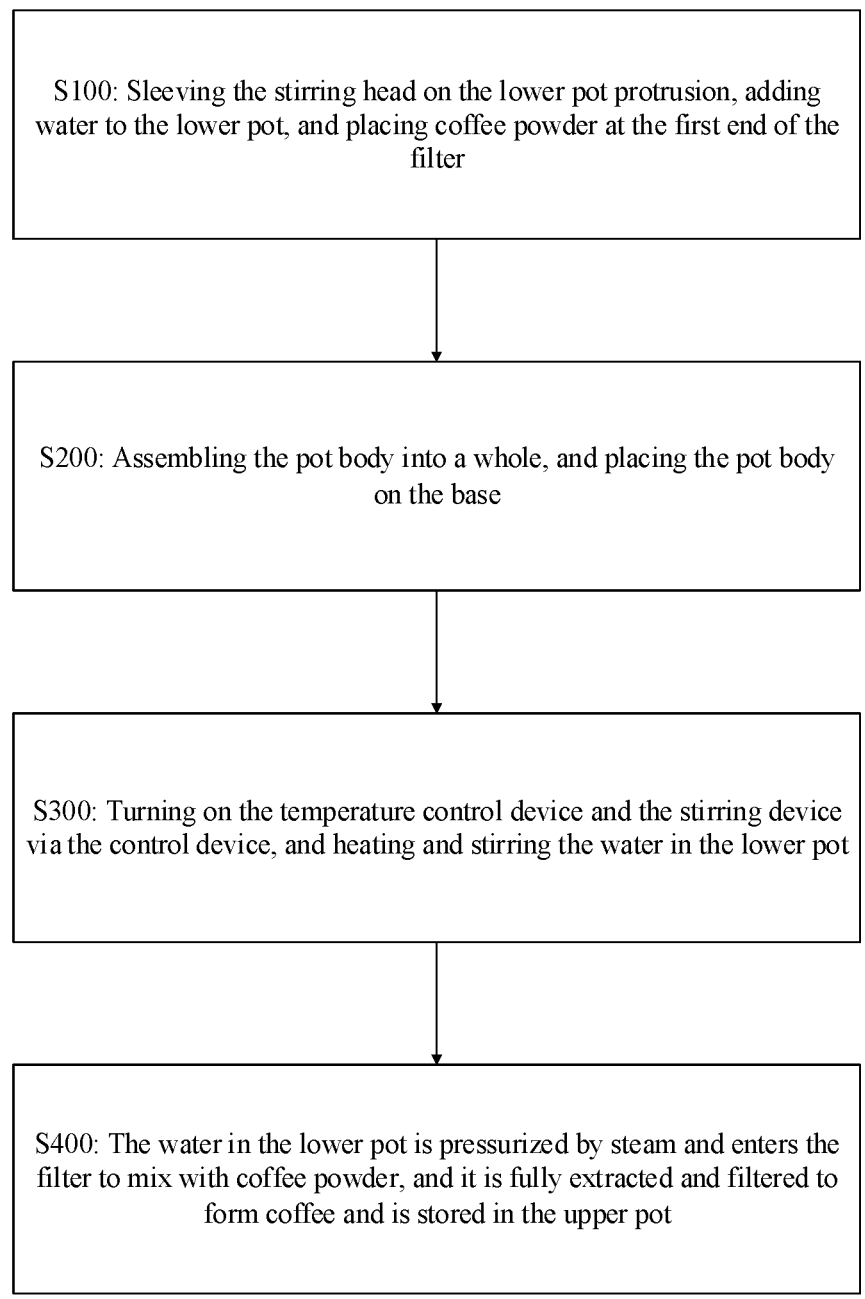
FIG. 10 is the flowchart of the method of use of the mocha pot combined device of the present disclosure.

As shown in FIG. 10, the present disclosure also provides a method of use of the mocha pot combined device, and the steps comprise:

S100: sleeving the stirring head on the lower pot protrusion, adding water to the lower pot, and placing coffee powder at the first end of the filter;

S200: assembling the pot body into a whole, and placing the pot body on the base;

S300: turning on the temperature control device and the stirring device via the control device, and heating and stirring the water in the lower pot;

S400: the water in the lower pot is pressurized by steam and enters the filter to mix with coffee powder, and the coffee mixture is fully extracted and filtered to form coffee and is stored in the upper pot.

In summary, the present disclosure provides a mocha pot combined device and its method of use. In the present disclosure, by combining the pot body with the base, setting a temperature control device and a stirring device in the base, setting a detachable upper pot and lower pot in the pot body, and setting a filter between the upper pot and lower pot, water is stored in the lower pot and heated and then flows into the filter to mix with coffee powder, and it is then extracted to form coffee and flows into the upper pot for storage. The stirring device ensures that the water in the lower pot is evenly heated and reaches the required temperature quickly, and the temperature control device ensures precise control of the water temperature and heating time, thereby realizing automatic control of the coffee-making process, guaranteeing the taste of the coffee and preventing the coffee quality from being affected due to improper operation by the user. At the same time, there is no need for the user to be present for monitoring during the production process, which saves waiting time and conserves energy.

It should be understood that the application of the present disclosure is not limited to the above-mentioned examples. Those of ordinary skill in the art can make improvements or changes based on the above description, and all these improvements and changes shall fall within the scope of protection of the appended claims of the present disclosure.

What is claimed is:

1. A mocha pot combined device, wherein comprising:
   a base, an upper part of the base is open to form a holding cavity, the base is provided with a stirring device under the holding cavity, and a temperature control device encircles the holding cavity;
   a pot body, the pot body comprises a lower pot placed in the holding cavity, an upper pot detachably connected to the lower pot, and a filter set in the lower pot and connected to the upper pot, water is stored in the lower pot, heated and flows into the filter to mix with coffee powder, and then extracted to form coffee that flows into the upper pot for storage,
   wherein:
   the lower pot has a stirring head which corresponds to the stirring device; and the stirring device comprises:
      a magnetic component that corresponds to the stirring head, and magnetic blocks that are correspondingly set in the magnetic component and the stirring head;
      a motor that drives a rotation of the magnetic component through a rotating shaft, and drives a rotation of the stirring head through a magnetic force between the magnetic component and the stirring head; and
   the filter is formed by sequentially connecting a first end, a connecting portion and a second end, which are all cylindrical, a diameter of the first end matches a dimension of a top opening of the lower pot and a diameter of the second end matches a dimension of the stirring head, after the filter and the lower pot are assembled, a top of the first end is flush with the top opening of the lower pot, and the second end encircles and envelops the stirring head.

2. The mocha pot combined device according to claim 1, wherein the temperature control device comprises:
   a heater that encircles the holding cavity;
   a temperature sensor that is set at a bottom of the holding cavity, with one end of the temperature sensor in contact with a bottom surface of the lower pot, and another end connected to the heater.

3. The mocha pot combined device according to claim 1, wherein the first end is provided with a first end partition with filter holes, and the first end partition is used for placing coffee powder, water enters the first end through the filter holes to mix with the coffee powder.

4. The mocha pot combined device according to claim 3, wherein the pot body has a filter screen that is located between the filter and the upper pot, after water mixes with coffee powder, a coffee mixture is filtered through the filter screen to form coffee and enters the upper pot.

5. The mocha pot combined device according to claim 4, wherein a center of a bottom of the upper pot has a through hole, and a hollow duct in the upper pot is perpendicular to the through hole, coffee flows into the upper pot for storage through the duct via the through hole.

6. The mocha pot combined device according to claim 5, wherein a top of the duct is detachably provided with a cap, and the cap guides coffee into the upper pot.

7. The mocha pot combined device according to claim 1, wherein the base further comprises a control device and a control circuit board, the control device is electrically connected to the control circuit board, and the control circuit board is separately electrically connected to the temperature control device and the stirring device.

8. A method for using the mocha pot combined device according to claim 1, comprising:
   S100: sleeving the stirring head on a lower pot protrusion, adding water to the lower pot, and placing coffee powder at the first end of the filter;
   S200: assembling the pot body into a whole, and placing the pot body on the base;

S300: turning on the temperature control device and the stirring device via a control device, and heating and stirring the water in the lower pot;

S400: the water in the lower pot is pressurized by steam and enters the filter to mix with coffee powder, and a coffee mixture is fully extracted and filtered to form coffee and is stored in the upper pot.

\* \* \* \* \*